United States Patent
Yokoyama et al.

(10) Patent No.: US 7,593,151 B2
(45) Date of Patent: Sep. 22, 2009

(54) DISPLAY UNIT AND SCANNING METHOD THEREFOR

(75) Inventors: Toshifumi Yokoyama, Osaka (JP);
Ken'ichi Kasazumi, Osaka (JP);
Akihiro Morikawa, Osaka (JP);
Kiminori Mizuuchi, Osaka (JP);
Kazuhisa Yamamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 281 days.

(21) Appl. No.: 10/582,340

(22) PCT Filed: Dec. 9, 2004

(86) PCT No.: PCT/JP2004/018362
§ 371 (c)(1),
(2), (4) Date: Jun. 9, 2006

(87) PCT Pub. No.: WO2005/057269
PCT Pub. Date: Jun. 23, 2005

(65) Prior Publication Data
US 2007/0081220 A1 Apr. 12, 2007

(30) Foreign Application Priority Data
Dec. 10, 2003 (JP) .............................. 2003-412125

(51) Int. Cl.
*G02B 26/08* (2006.01)

(52) U.S. Cl. .............. 359/216.1; 359/201.1; 359/201.2; 359/202.1; 359/204.1; 359/204.2; 359/204.4; 359/208.2; 359/217.2; 359/315; 359/900

(58) Field of Classification Search .................. None
See application file for complete search history.

(56) References Cited

U.S. PATENT DOCUMENTS

| | | | |
|---|---|---|---|
| 4,307,930 A | 12/1981 | Saito | 350/6.6 |
| 5,044,710 A | 9/1991 | Iwai et al. | 359/217 |
| 2002/0159036 A1* | 10/2002 | Yamagishi et al. | 353/31 |
| 2003/0174255 A1* | 9/2003 | Lee et al. | 348/744 |
| 2003/0210444 A1 | 11/2003 | Lee | 359/202 |

FOREIGN PATENT DOCUMENTS

| | | |
|---|---|---|
| EP | 0 827 005 | 3/1998 |
| EP | 1292134 A2 | 3/2003 |
| EP | 1292134 A3 | 8/2004 |
| JP | 50-26305 | 8/1975 |
| JP | 57-52031 | 3/1982 |
| JP | 57052031 | 3/1982 |
| JP | 63-267909 | 11/1988 |
| JP | 01-013114 | 1/1989 |
| JP | 01013114 | 1/1989 |
| WO | WO 94/09989 | 5/1994 |

* cited by examiner

*Primary Examiner*—James Phan
(74) *Attorney, Agent, or Firm*—Steptoe & Johnson LLP

(57) ABSTRACT

In a display unit which makes coherent light perform scanning on a screen to display an image, it is necessary to rotate a polygon mirror at ultrahigh speed for display of a high resolution image such as HDTV, and therefore, a high-performance polygon mirror must be employed, and further, noise and power consumption during rotation of the polygon mirror cause problems.

Mirrors for multiple reflection (6a) and (6b) are inserted in a coherent light scanning optical system, whereby plural scanning lines can be obtained while one plane of the polygon mirror (5) scans one line of coherent light, leading to reduction in the rpm of the polygon mirror.

16 Claims, 11 Drawing Sheets

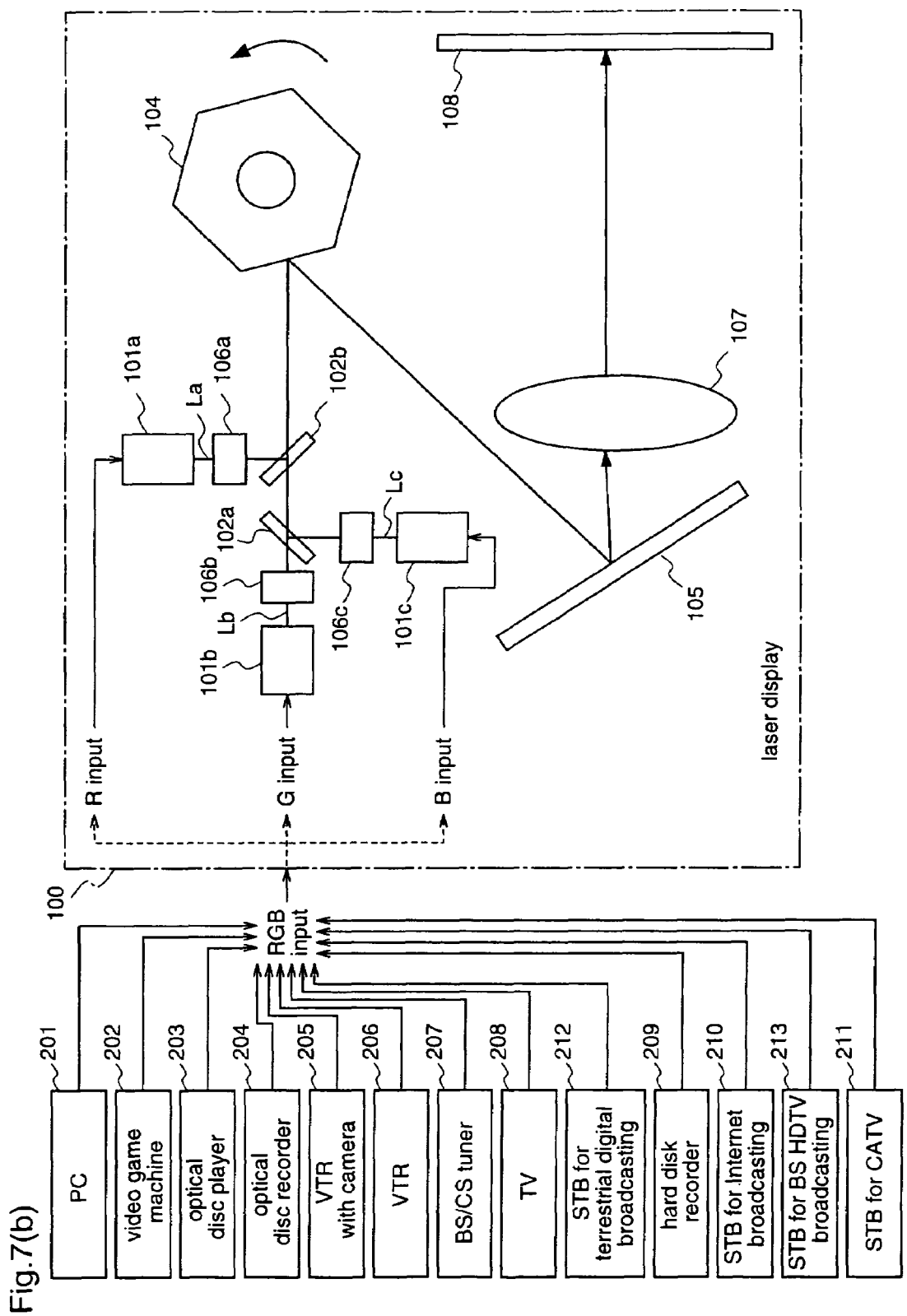

US 7,593,151 B2

DISPLAY UNIT AND SCANNING METHOD THEREFOR

CLAIM OF PRIORITY

This application claims priority under 35 USC 371 to International Application No. PCT/JP2004/018362, filed on Dec. 9, 2004, which claims priority to Japanese Patent Application No. 2003-412125, filed on Dec. 10, 2003, each of which is incorporated by reference in its entirety.

TECHNICAL FIELD

The present invention relates to a display unit for projecting or transmitting coherent light on or through a screen to display an image, and a scanning method therefor.

BACKGROUND ART

As a conventional display unit using coherent light, there has been known a display unit using a spatial modulation element as disclosed in Patent Document 1 (Japanese Published Patent Application No. 2003-98476 (Page 4, FIG. 1)). In addition to the display unit disclosed in Patent Document 1, there is a display unit which projects coherent light on a screen using a polygon mirror as shown in FIG. 7(a). Hereinafter, a conventional laser display unit shown in FIG. 7(a) will be described.

FIG. 7(a) is a diagram illustrating a schematic construction of the conventional laser display unit.

The laser display unit 100 includes laser light sources 101a~101c corresponding to three colors of R, G, B, and optical modulator 106a~106c for subjecting laser beams La~Lc emitted from the laser sources 101a~101c to intensity modulation according to primary color signals Sa~Sc of an input video signal. Further, the laser display 100 includes a dichroic mirror 102a for wave coupling the laser beam Lb modulated by the optical modulator 106b and the laser beam Lc modulated by the optical modulator 106c, and a dichroic mirror 102b for wave coupling the laser beam La modulated by the optical modulator 106a and the laser beam from the dichroic mirror 102a. Further, this laser display 100 includes a polygon mirror 104 for scanning the laser beam wave coupled by the dichroic mirror 102b in an x direction, a galvanometer mirror 105 for scanning the light from the polygon mirror 104 in a y direction so that a two-dimensional image is formed on a screen 108, and a projection lens 107 for projecting the laser beam emitted by the galvanometer mirror on the screen 108.

Next, the operation will be described.

The laser beams La~Lc from the laser sources 101a~101c corresponding to the three colors of R, G, and B are subjected to intensity modulation by the optical modulators 106a~106c according to the respective primary color signals Sa~Sc of the input video signal, and then wave coupled by the optical system comprising the dichroic mirrors 102a and 102b. Further, the laser beam wave coupled by the dichroic mirror 102b is scanned in the x direction by the polygon mirror 104 and in the y direction by the galvanometer mirror 105. The laser beam scanned in the two-dimensional direction is projected on the screen 108 by the projection lens 107, whereby a two-dimensional image is displayed on the screen 108.

As described above, in the conventional laser display 100, since the light beams emitted from the laser sources 101a~101c corresponding to R, G, B are monochromatic light beams, a displayable color range becomes wider than that of an NTSC signal by using laser sources of appropriate wavelengths, and further, a vivid image having high chromatic purity is possible.

FIG. 7(b) is a diagram illustrating devices connectable to the conventional laser display unit. The laser display unit 100 shown in FIG. 7(b) has R, G, B terminals to which a video signal is inputted, and any device can be connected to the laser display unit 100 so long as it has an output terminal of an RGB signal, such as a personal computer 201 like a notebook PC, a video game machine 202, an optical disc player 203 such as a DVD, an optical disc recorder 204 including a recorder with VTR, a VTR with a camera 205, a stationary VTR 206, a BS/CS tuner 207, a TV 208, a hard disk recorder 209 including recorders with various kinds of disk drives, an internet broadcasting STB (Set Top Box) 210, a CATV STB 211, a terrestrial digital broadcasting STB 212, or a BS HDTV STB 213.

Further, a D4 input terminal, a DVI-D input terminal, an IEEE1394 terminal, a component terminal, an S terminal, a video terminal and the like may be provided according to the formats of the signals outputted from the devices connected to the laser display.

DISCLOSURE OF THE INVENTION

Problems to be Solved by the Invention

When displaying an image having a resolution equivalent to that of a HDTV using the conventional laser display, it is necessary to rotate the polygon mirror at a high speed. For example, 2000(horizontal direction)×1125(vertical direction) scanning lines are needed to display a high vision image. Moreover, the scanning lines must be scanned 30 times or more per second. In this case, image display in the horizontal direction is realized by performing 2000 times of switching while performing scanning with one plane of the polygon mirror. On the other hand, since scanning in the vertical direction is relating to the number of planes of the polygon mirror and the rpm of the polygon mirror, the following drawbacks occur.

That is, the rpm of the polygon mirror is expressed by, RPM=1125(lines)×30(times)×60(sec)÷20(planes)=about 100,000 (RPM). In order to realize such high-speed rotation, it is necessary to use not only a high-performance polygon mirror but also a high-performance motor and a durable motor bearing. Further, such high-speed rotation causes an increase in noise during the rotation, and an increase in power consumption.

Further, it might be considered that the number of scanning lines can be increased by increasing the number of planes of the polygon mirror instead of increasing the number of rpm of the polygon mirror. However, when the number of planes of the polygon mirror is increased, the size of the polygon mirror itself is increased, leading to difficulty in reducing the size of the laser display unit.

The present invention is made to solve the above-described problems and has for its object to provide a display unit in which coherent light is projected on a scanning screen using a polygon mirror, which display unit is able to display an image having high resolution equivalent to that of an HDTV, without increasing the rpm of the polygon mirror, and further, without increasing the number of planes of the polygon mirror.

Measures to Solve the Problems

In order to solve the above-described problems, according to the present invention, there is provided a display unit having a coherent light scanning system for scanning coherent light, and projecting the coherent light onto a screen using the coherent light scanning system, wherein the coherent light scanning system comprises a polygon mirror for reflecting the coherent light so that scanning on the screen is carried out by its rotation; and an optical path formation part for forming an optical path of the coherent light to reach the screen so that plural scannings are carried out on the screen by the coherent light that is reflected at one reflection plane of the polygon mirror.

Therefore, the number of lines that can be scanned within a predetermined period of time is increased as compared with the case of using the polygon mirror alone, leading to reduction in the rpm of the polygon mirror.

According to the present invention, the optical path formation part changes the scanning direction by the coherent light, which is determined in accordance with the rotation direction of the polygon mirror.

Therefore, each of the coherent light whose scanning direction is changed can be projected on the screen as plural scanning lines, whereby the number of lines that can be scanned within a predetermined period of time is increased, leading to reduction in the rpm of the polygon mirror.

According to the present invention, the optical path formation part comprises a reflection mirror which is disposed on a path of reflected light from the polygon mirror, and reflects the coherent light from the polygon mirror.

Therefore, the number of lines that can be scanned within a predetermined period of time can be increased by the simple structure that the coherent light reflected at the polygon mirror is again reflected by the reflection mirror, leading to reduction in the rpm of the polygon mirror.

According to the present invention, the reflection mirror is disposed in a position at which the reflection mirror reflects the coherent light from the polygon mirror while the rotation angle of the polygon mirror is within a predetermined range.

Therefore, the scanning direction of the coherent light reflected at the polygon mirror is changed by the reflection mirror and each of the coherent light whose scanning direction is changed is projected on the screen, whereby the number of lines that can be scanned within a predetermined period of time is increased, leading to reduction in the rpm of the polygon mirror.

According to the present invention, there are disposed a plurality of the reflection mirrors.

Therefore, the scanning direction of the coherent light reflected at the polygon mirror can be varied in more directions, whereby the number of lines that can be scanned within a predetermined period of time can be further increased.

According to the present invention, the plural reflection mirrors are two mirrors which are disposed with reflection surfaces thereof being opposed to each other; and the two reflection mirrors are disposed so that the coherent light that is reflected by each of the two reflection mirrors and the coherent light that passes through a space between the two reflection mirrors scan the same range on the screen.

Therefore, three scanning lines can be obtained from the coherent light reflected at the polygon mirror by only setting the arrangement of the two reflection mirrors, leading to reduction in the rpm of the polygon mirror.

According to the present invention, the reflection mirrors multiple-reflect the coherent light.

Therefore, more scanning lines can be scanned from the coherent light reflected at the polygon mirror, leading to reduction in the rpm of the polygon mirror.

According to the present invention, the two reflection mirrors are disposed rotatably about an axis that is perpendicular to the scanning direction of the coherent light.

Therefore, the plural scanning lines which are obtained by projecting the coherent light on the screen can be scanned within the same range by only adjusting the angles of the reflection mirrors.

According to the present invention, the optical path formation part has a high-speed deflector for deflecting a single beam of coherent light applied to one reflection plane of the polygon mirror to generate plural beams, and outputting the plural beams to the polygon mirror.

Therefore, when the coherent light is scanned by the polygon mirror, the scanning is carried out with the scanning lines being previously increased, leading to reduction in the rpm of the polygon mirror.

According to the present invention, the high-speed deflector comprises an EO (Electro Optical) deflection device.

Therefore, when the coherent light is scanned by the polygon mirror, the scanning is carried out with the scanning lines being previously increased, leading to reduction in the rpm of the polygon mirror.

According to the present invention, the high-speed deflector deflects the coherent light along the direction that is approximately perpendicular to the scanning direction of the polygon mirror.

Therefore, the scanning lines can be increased with the scanning of the coherent light by the polygon mirror, leading to reduction in the rpm of the polygon mirror.

According to the present invention, the optical path formation part includes a free-form surface mirror which is disposed on a path of reflected light from the polygon mirror, and has at least one reflection plane of free-form surface shape.

Therefore, the scanning lines can be increased by reflecting the coherent light with the free-form surface mirror, leading to reduction in the rpm of the polygon mirror.

According to the present invention, the free-form surface mirror has two or more reflection planes.

Therefore, the scanning lines are increased by the number of the reflection planes, leading to reduction in the rpm of the polygon mirror.

According to the present invention, the reflection planes include first and third reflection planes having free-form surface shapes, and a second reflection plane having a planar shape, which is sandwiched between the first and third reflection planes.

Therefore, three scanning lines can be obtained by the free-form surface mirror, leading to reduction in the rpm of the polygon mirror.

According to the present invention, the first to third reflection planes are shaped such that the respective coherent light beams applied to the first to third reflection planes scan the same range on the screen.

Therefore, the scanning lines can be increased by only determining the position where the free-form surface mirror is disposed and the shapes of the free-form surfaces of the reflection planes, leading to reduction in the rpm of the polygon mirror.

According to the present invention, there is provided a display unit having a coherent light scanning system for scanning coherent light, and projecting the coherent light onto a screen using the coherent light scanning system, wherein the coherent light scanning system comprises a polygon mirror for scanning the coherent light in its rotation direction, and an optical path formation part for multiplying the number of scanning lines of the coherent light; and the optical path formation unit comprises a high-speed deflector for deflecting a single beam of coherent light to generate plural beams, and outputting the plural beams to the polygon mirror, and a reflection mirror which is disposed on a path of reflected light from the polygon mirror, and reflects the plural coherent lights from the polygon mirror.

Therefore, the scanning lines can be further increased, leading to further reduction in the rpm of the polygon mirror.

According to the present invention, there is provided a display unit having a coherent light scanning system for scanning coherent light, and projecting the coherent light onto a screen using the coherent light scanning system, wherein the scanning system comprises a polygon mirror for scanning the coherent light in its rotation direction, and an optical path formation part for multiplying the number of scanning lines of the coherent light; and the optical path formation part comprises a high-speed deflector for deflecting a single beam of coherent light to generate plural beams, and outputting the plural beams to the polygon mirror, and a free-form surface mirror which is disposed on a path of reflected light from the polygon mirror, and includes at least one reflection plane of free-form surface shape.

Therefore, the scanning lines can be further increased, leading to further reduction in the rpm of the polygon mirror.

According to the present invention, there is provided a coherent light scanning method for performing scanning with coherent light on a screen, and the method comprises rotating a polygon mirror that reflects the coherent light so that scanning is carried out on the screen by the coherent light reflected at the polygon mirror; and forming an optical path of the coherent light to reach the screen so that plural scannings are carried out on the screen by the coherent light reflected at one reflection plane of the polygon mirror.

Therefore, the number of lines that can be scanned within a predetermined period of time is increased as compared with the case of using the polygon mirror alone, leading to reduction in the rpm of the polygon mirror.

According to the present invention, there is provided a coherent light scanning method for performing scanning with coherent light on a screen, and the method comprises rotating a polygon mirror that reflects the coherent light, so that scanning is carried out on the screen by the coherent light reflected at the polygon mirror; and reflecting the coherent light that is reflected at one reflection plane of the polygon mirror by at least one mirror which is disposed on a path of reflected light from the polygon mirror up to the screen so that plural scannings are carried out on the screen by the coherent light.

Therefore, the number of lines that can be scanned within a predetermined period of time can be increased by the simple structure that the coherent light reflected at the polygon mirror is further reflected by the reflection mirror, leading to reduction in the rpm of the polygon mirror.

According to of the present invention, there is provided a coherent light scanning method for performing scanning with coherent light on a screen, and the method comprises deflecting a single coherent lights in a direction approximately perpendicular to the scanning direction of a polygon mirror, thereby to generate plural beams; and rotating the polygon mirror that reflects the plural coherent lights so that plural scannings are carried out on the screen by the plural coherent lights reflected at the polygon mirror.

Therefore, when the coherent light is scanned with the polygon mirror, the scanning is carried out with the scanning lines being previously increased, leading to reduction in the rpm of the polygon mirror.

According to the present invention, there is provided a coherent light scanning method for performing scanning with coherent light on a screen, and the method comprises rotating a polygon mirror that reflects the coherent light, so that scanning is carried out on the screen by the coherent light reflected at the polygon mirror; and reflecting the coherent light that is reflected at one reflection plane of the polygon mirror, so that plural scannings are carried out on the screen by the coherent light, by using a free-form surface mirror having a free-form surface shape, which is disposed on a path of reflected light from the polygon mirror to reach the screen.

Therefore, the scanning lines are increased when the reflected light from the polygon mirror is reflected by the free-form surface mirror, leading to reduction in the rpm of the polygon mirror.

EFFECTS OF THE INVENTION

According to the present invention, highly precise image display is realized with the rpm of the polygon mirror being reduced, whereby noise that occurs during rotation of the polygon mirror and power consumption required for the rotation can be reduced. Further, even when the rpm of the polygon mirror is fixed to a predetermined rpm, it is not necessary to increase the number of planes of the polygon mirror in order to increase the number of scanning lines, thereby preventing the polygon mirror from increasing in the size.

BRIEF DESCRIPTION OF THE DRAWINGS

FIG. 2(a) is a diagram for explaining the operation of the first embodiment, illustrating a case where laser light is reflected at a mirror 6a.

FIG. 7(b) is a diagram illustrating examples of devices that are connectable to the conventional display unit.

DESCRIPTION OF REFERENCE NUMERALS

| | |
|---|---|
| 1, 2, 3 | light sources |
| 4 | laser light |
| 5 | polygon mirror |
| 6a, 6b | mirror |
| 7 | galvanometer mirror |
| 8 | projection lens |
| 9 | screen |
| 10a, 10b | dichroic mirror |
| 11a, 11b, 11c, 11d, 16 | high-speed deflector |
| 12a, 12b | free-form surface mirror |
| 13, 14, 15 | optical modulator |
| 20, 20a, 20b | controller |
| 21 | laser driver |
| 22, 22a, 22b, 22c | deflector driver |
| 23 | motor driver |
| 24 | motor |
| 25, 25a, 27 | clinometer driver |
| 26, 26a, 28 | mirror clinometer |
| 30, 31, 32, 33 | laser display |
| 30a, 31a, 32a, 33a | coherent light scanning system |
| 30b, 30c, 30d, 30e | optical path formation part |
| VP | virtual image plane |
| FSC1, FSC2, FSC3, FSC1a, FSC2a, FSC3a | reflection plane |

BEST MODE TO EXECUTE THE INVENTION

Embodiment 1

According to a first embodiment of the present invention, reflected light from a polygon mirror is further applied onto two mirrors, whereby plural lines can be scanned on a screen while laser light is reflected at one plane of the polygon mirror.

Figure 1:
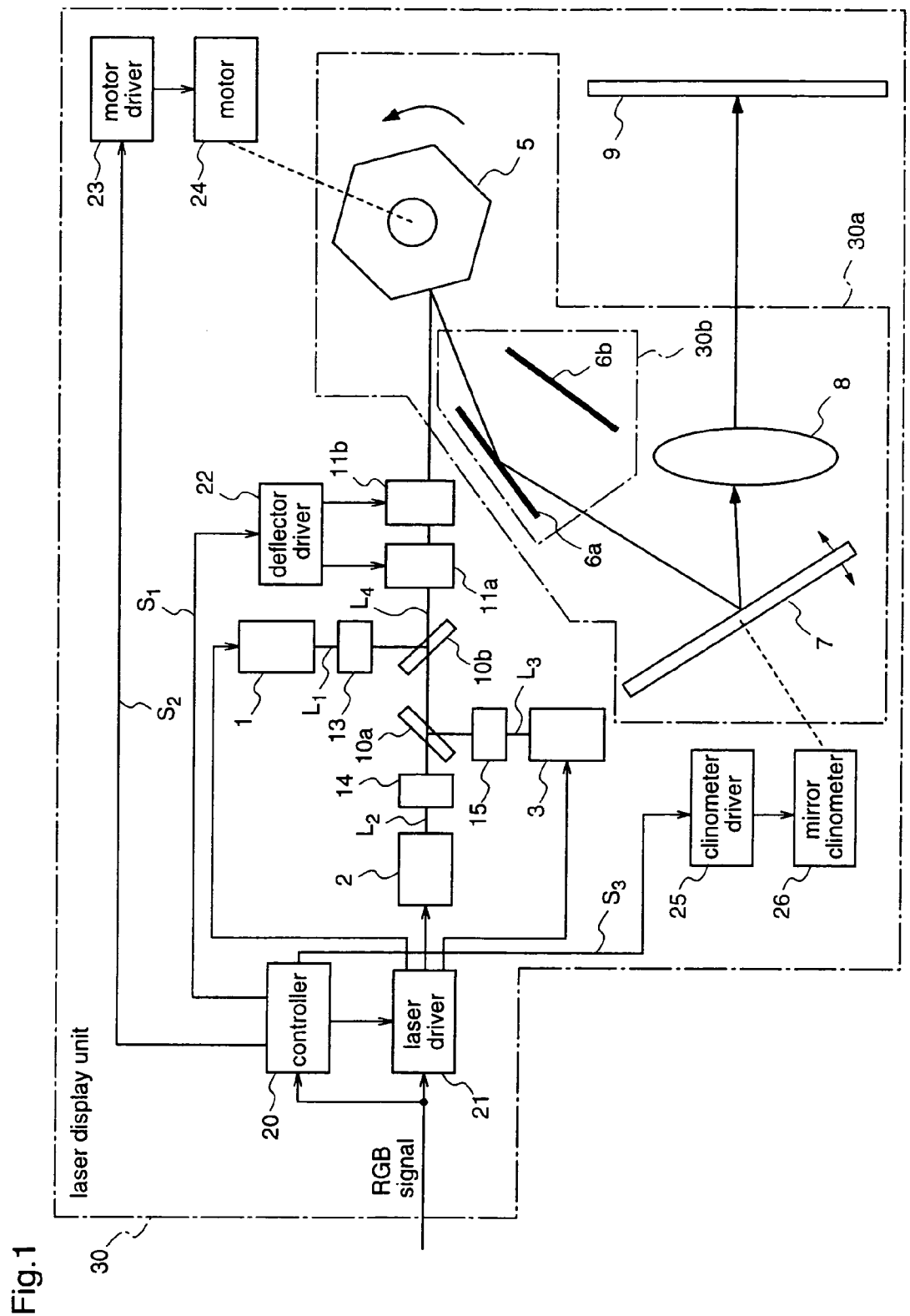
FIG. 1 is a diagram for explaining a display unit according to a first embodiment of the present invention.

FIG. 1 is a block diagram illustrating a schematic structure of a laser display unit according to the first embodiment of the present invention.

The laser display unit 30 shown in FIG. 1 includes laser sources 1~3 corresponding to primary color signals of R (red), G (green), and B (blue), respectively, optical modulators 13~15 for intensity-modulating laser beams L1~L3 outputted from the laser sources 1~3 according to an image signal, a dichroic mirror 10a for wave coupling the laser beam L2 modulated by the optical modulator 14 and the laser beam L3 modulated by the optical modulator 15, a dichroic mirror 10b for wave coupling the laser beam L1 modulated by the optical modulator 13 and the laser beam outputted from the dichroic mirror 10a, and high-speed deflectors 11a and 11b for deflecting the laser beam L4 from the dichroic mirror 10b in the vertical direction and the horizontal direction.

Further, the laser display unit 30 includes a coherent light scanning system 30a comprising a polygon mirror 5, incident mirrors 6a and 6b, a galvanometer mirror 7, and a projection lens 8, and a screen 9 for displaying the laser beam L2 projected by the projection lens 8. In the coherent light scanning system 30a, the polygon mirror 5 scans the laser beam L4 that is obtained by wave coupling by the dichroic mirror 10b in the x direction. The mirrors 6a and 6b respectively receive the laser beam L4 which is reflected by the polygon mirror 5 to guide the beam to the galvanometer mirror 7. These mirrors 6a and 6b constitute an optical path formation part 30b in the coherent light scanning system 30a. The optical path formation part 30b will be described in detail later. The galvanometer mirror 7 scans the laser beam L4 in the y direction. The projection lens 8 collects the laser beam L4 reflected by the galvanometer mirror 7 and projects the beam onto the screen 9.

Furthermore, the laser display 30 includes a controller 20, a laser driver 21, a deflector driver 22, a clinometer driver 25, a mirror clinometer 26, a motor driver 23, and a motor 24. The motor 24 rotates the polygon mirror 5. The first mirror clinometer 26 rotates the galvanometer mirror 7. The laser driver 21, the deflector driver 22, the clinometer driver 25, and the motor driver 23 drive the laser sources 1, 2, and 3, the high-speed deflectors 11a and 11b, the clinometer 26, and the motor 24, respectively, and the controller 20 controls the operation of the laser display 30 through the respective drivers.

Next, the operation will be described.

With reference to FIG. 1, the laser driver 21 receives the externally inputted RGB signal, and applies a driving current to the laser sources 1, 2, and 3, whereby the laser sources 1, 2, and 3 output laser beams L1, L2, and L3 corresponding to red, green, and blue, respectively. The laser beams L1, L2, and L3 are intensity-modulated by the optical modulators 13, 14, and 15, respectively, and then wave coupled by using the dichroic mirrors 10a and 10b, resulting in the laser beam L4. The laser beam L4 is deflected in the vertical direction and the horizontal direction by the high-speed deflectors 11a and 11b, respectively, and then applied to the polygon mirror 5.

The laser beam L4 reflected at one plane of the polygon mirror 5 is initially incident on the galvanometer mirror 7 through the mirror 6a. When the polygon mirror 5 is rotated, the laser beam L4 is directly incident on the galvanometer mirror 7 without passing through the incident mirrors 6a and 6b. When the polygon mirror 5 is further rotated, the laser beam L4 is incident on the galvanometer mirror 7 through the mirror 6b.

The controller 20 controls the angle of gradient of the mirror clinometer 26 through the clinometer driver 25, whereby the galvanometer mirror 7 guides the laser beam L4 to the projection lens 8 with the angle of gradient thereof being varied, while the laser light L4 reflected at one plane of the polygon mirror 5 is applied thereto. The laser beam L4 incident on the projection lens 8 is projected onto the screen 9, whereby three lines of scannings are carried out on the screen 9 while the laser beam L4 is reflected at the one plane of the polygon mirror 5.

Next, the principle of multiplication of scanning lines by the optical path formation part 30a will be described with reference to FIGS. 2 and 3.

Figure 2A:
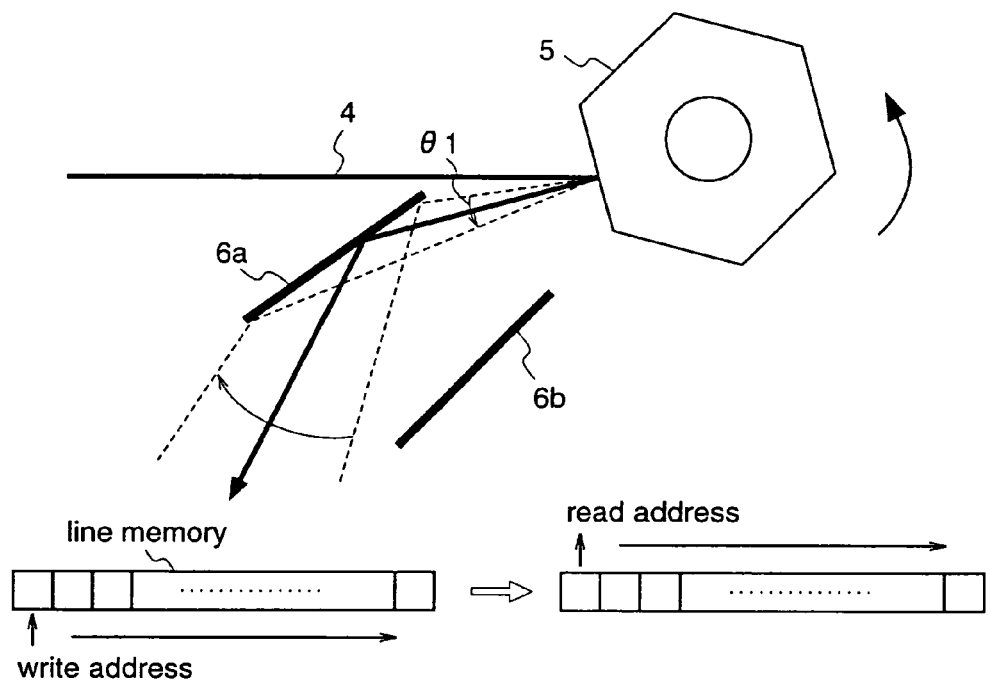
Figure 2B:
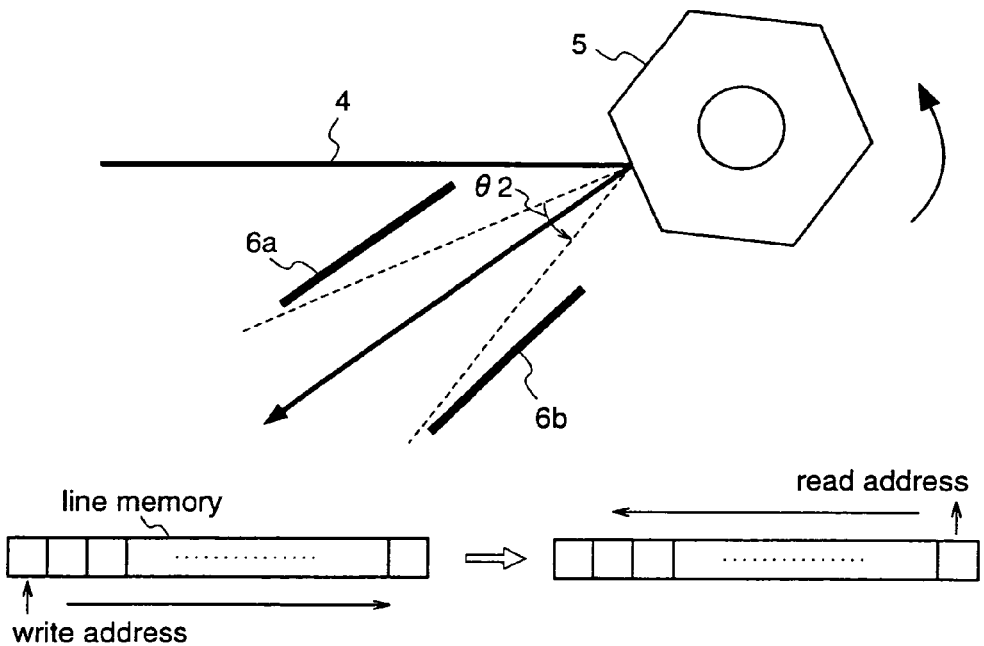
FIG. 2(b) is a diagram for explaining the operation of the first embodiment, illustrating a case where laser light is reflected by neither a mirror 6a nor a mirror 6b.
Figure 2C:
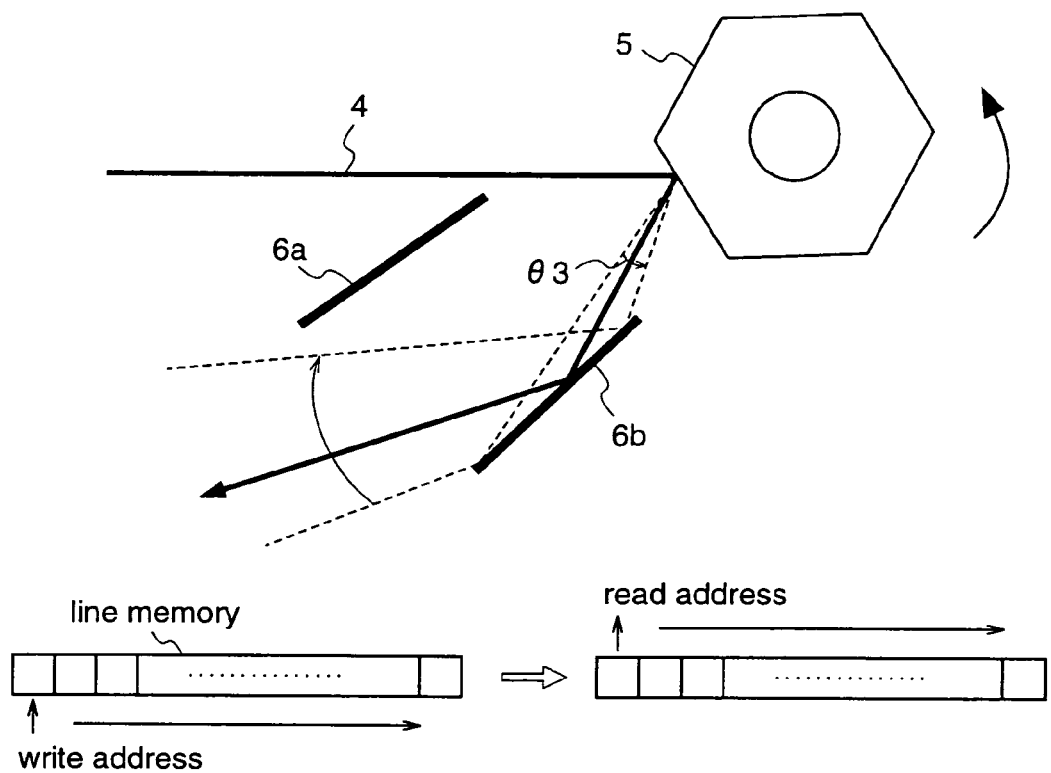
FIG. 2(c) is a diagram for explaining the operation of the first embodiment, illustrating a case where laser light is reflected at a mirror 6b.
Figure 3A:
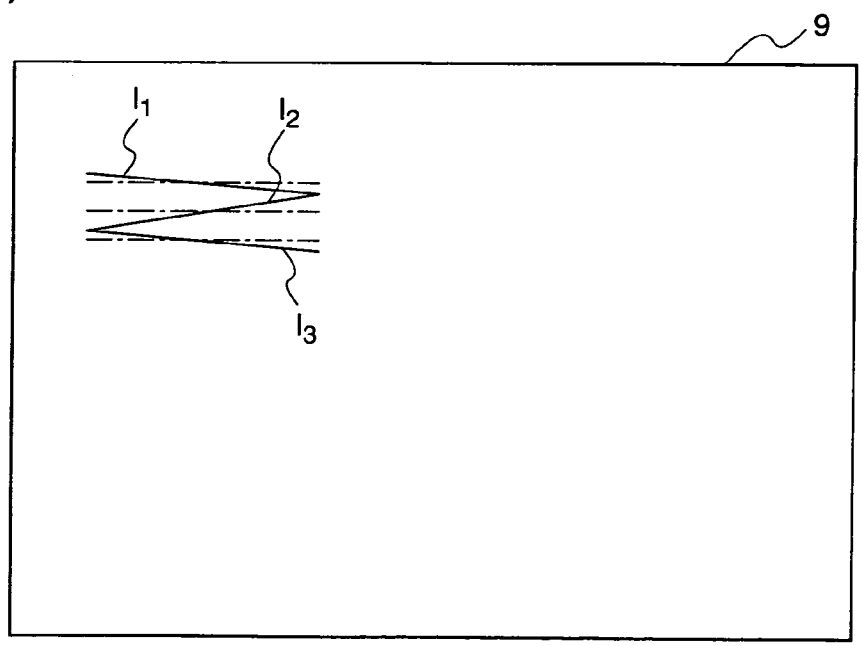
FIG. 3(a) is a diagram for explaining scanning lines on a screen according to the first embodiment.
Figure 3B:
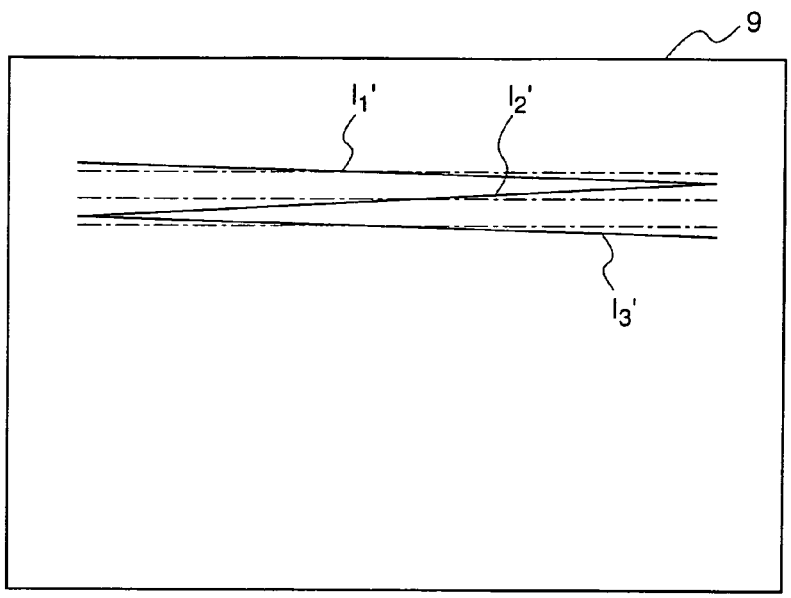
FIG. 3(b) is a diagram for explaining correction of vertical scanning using a high-speed deflector according to the first embodiment.

FIGS. 2(a)~2(c) are diagrams illustrating the laser beams L4 reflected at the polygon mirror 5 and the incident mirrors 6a and 6b. Further, FIGS. 2(a)~2(c) schematically show the input/output relationship of the RGB signal in the line memory when the reflection angle of the laser beam L4 is within ranges of θ1~θ3 shown in FIGS. 2(a)~2(c), respectively. FIGS. 3(a) and 3(b) are diagrams illustrating scanning lines on the screen 9 which are obtained when the laser beam L4 is reflected at one plane of the polygon mirror 5.

In FIG. 2(a), the laser beam L4 reflected at the polygon mirror 5 scans on the mirror 6a from an end on the polygon mirror 5 side to an end on the galvanometer mirror 7 side, according to rotation of the polygon mirror 5. While the laser beam L4 scans on the mirror 6a, i.e., when the reflection angle of the laser beam L4 reflected at the polygon mirror 5 is within the range of angle θ1 enclosed in dotted lines in FIG. 2(a), the scanning direction of the laser light L4 that scans on the galvanometer mirror 7 is opposed to the rotation direction of the polygon mirror 5, and scanning is performed on the screen 9 in the direction from left to slightly lower right as shown by 11 in FIG. 3(a).

When the polygon mirror 5 is further rotated from the state of FIG. 2(a) and thereby the output angle of the laser beam L4 reflected by the polygon mirror 5 becomes angle θ2 shown in FIG. 2(b), the laser beam L4 scans a space between ends of the mirrors 6a and 6b on the galvanometer mirror 7 side, and it is guided directly to the galvanometer mirror 7 and projected onto the screen 9 through the projection lens 8. The scanning direction of the laser beam L4 that scans on the galvanometer mirror 7 during this time is identical to the rotation direction of the polygon mirror 5, whereby scanning is carried out on the screen 9 in the direction from right to slightly lower left shown by 12 in FIG. 3(a).

When the polygon mirror 5 is further rotated, the laser beam L4 scans on the mirror 6b from an end of the mirror 6b on the galvanometer mirror 7 side toward an end of the mirror 6b on the polygon mirror 5 side. While the laser beam L4 scans on the mirror 6b, i.e., when the reflection angle of the laser beam L4 reflected by the polygon mirror 5 is within the range of angle θ3 enclosed by dotted lines in FIG. 2(c), the scanning direction of the laser beam L4 that scans on the galvanometer mirror 7 is opposed to the rotation direction of the polygon mirror 5, whereby scanning is carried out on the screen in the direction from left to slightly lower right as shown by 13 in FIG. 3(a).

In order to realize the above-mentioned scanning, it is necessary that the laser beams L4 reflected at the mirrors 6a and 6b, and the laser beam L4 that passes through a space between the mirrors 6a and 6b scan the same range on the screen 9. For this purpose, relationship of θ1=θ2=θ3 must be established among the emission angles θ1, θ2, and θ3 of the laser beam L4 shown in FIGS. 2(a)~2(c), respectively. Accordingly, the mirrors 6a and 6b are disposed at predetermined angles that satisfy the above-mentioned relationship.

Figure 3C:
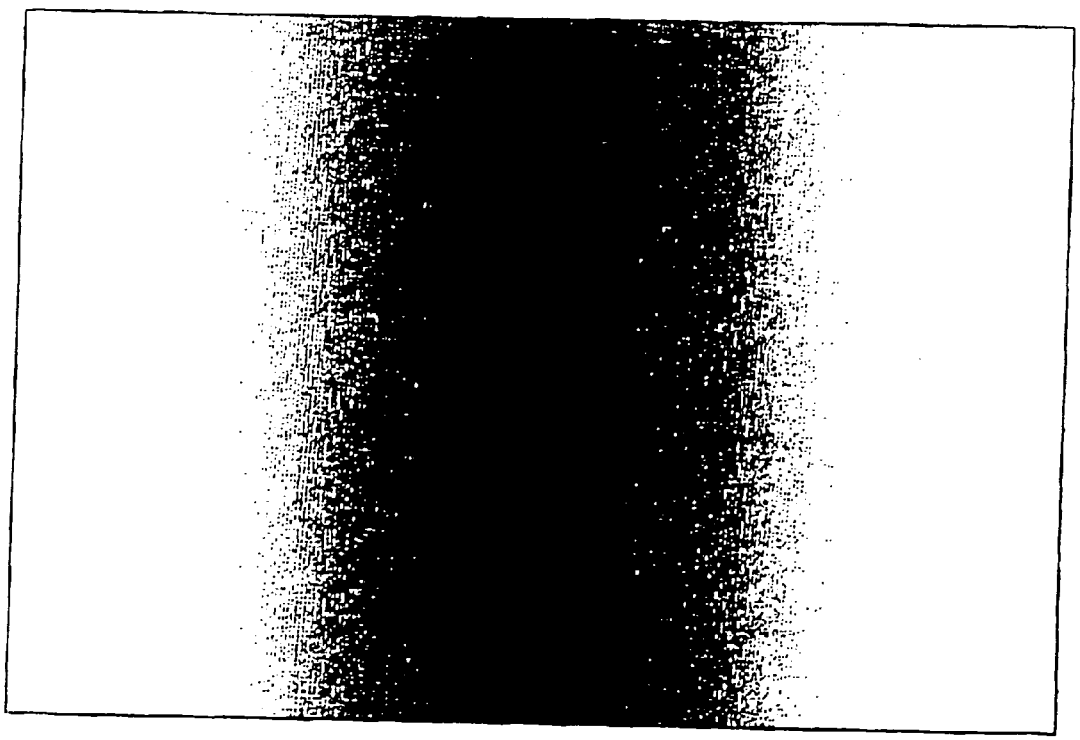
FIG. 3(c) is a diagram for explaining correction of horizontal scanning using a high-speed deflector according to the first embodiment.

Further, each of the three scanning lines 11~13 obtained on the screen 9 by the above-mentioned scanning is equal to a length that is obtained by dividing, into three, a length of one scanning line obtained when scanning is carried out with the polygon mirror 5 alone, and therefore, it is necessary to perform correction so that each scanning line length on the screen 9 becomes equal to one scanning line length on the screen 9. So, in this first embodiment, an optical path length from the polygon mirror 5 and the screen 9 by which each of the scanning lines 11~13 become equal to the original one line length on the screen 9 is obtained, and the respective components included in the coherent light scanning system 30a are disposed so as to satisfy the optical path length, and further, a fθ correction optical system (not shown) such as a fθ lens is disposed behind the mirrors 6a and 6b. Thereby, the three scanning lines on the screen 9 have the respective scanning ranges shown by 11'~13' in FIG. 3(b), respectively, which are equal to each other and equal to those obtained when one line is scanned with the polygon mirror alone. The scanning lines 11'~13' on the screen 9 obtained as described above slightly lean with respect to the horizontal direction as shown in FIG. 3(b). So, in this first embodiment, positional correction of the laser beam L4 in the vertical direction is carried out using the high-speed deflector 11a to enable horizontal scanning as shown by broken lines in FIG. 3(b). Further, positional correction of the laser beam L4 in the horizontal direction is also required. To be specific, since nonuniform distribution of density occurs in the horizontal direction on the screen 9 as shown in FIG. 3(c) when positional correction of the laser beam L4 in the horizontal direction is not carried out, positional correction of the laser beam L4 in the horizontal direction is carried out using the high-speed deflector 11b to make the density in the horizontal direction uniform. In this first embodiment, EO (Electro Optical) deflection devices are used as the high-speed deflectors 11a and 11b, and the controller 20 controls the deflection angles of the high-speed deflectors 11a and 11b through the deflector driver 22. However, lenses for correction may be used instead of the high-speed deflectors 11a and 11b.

Further, scanning on the screen 9 is carried out so that the laser beam L4 goes and returns left and right on the screen as shown in FIG. 3(a) or 3(b), and it is not so-called progressive scanning, i.e., sequential scanning from left to right on the screen.

So, in order to realize progressive scanning, a line memory (not shown) comprising an analog memory such as a CCD is prepard, and the RGB signal is temporary stored in the line memory, and then the controller 20 performs control so as to change the order of reading the RGB signal from the line memory. To be specific, the RGB signal is initially input to the line memory before being input to the laser sources 1, 2, and 3. In the state shown in FIGS. 2(a) and 2(c), i.e., when the scanning direction of the laser beam L4 that scans on the galvanometer mirror 7 is opposed to the rotation direction of the polygon mirror 5, data are read from the line memory in the order of writing the RGB signal in the line memory, as shown in FIGS. 2(a) and 2(c). On the other hand, in the state shown in FIG. 2(b), i.e., when the scanning direction of the laser beam L4 that scans on the galvanometer mirror 7 is identical to the rotation direction of the polygon mirror 5, data are read from the line memory in the order reverse to the order of writing the RGB signal in the line memory, as shown in FIG. 2(b). This control realizes progressive scanning by the laser display 30 according to the first embodiment. The line memory may be implemented by a digital memory having an AD converter and a DA converter disposed before and behind the memory.

In order to realize video display identical to that performed in the case where scanning is carried out by the polygon mirror 5 alone, the controller 20 controls the laser sources 1, 2, and 3 to output an original one line of video data while the respective scanning lines 11~13 shown in FIG. 3(a) are scanned. That is, while the respective scanning lines 11~13 are scanned, the controller 20 controls the laser sources 1, 2, and 3 to compress and output one line of data on the screen 9, thereby realizing video display identical to that performed in the case where scanning is carried out with the polygon mirror 5 alone.

As described above, according to the first embodiment, a pair of mirrors 6a and 6b are disposed in the path of the reflected light from the polygon mirror 5, and the disposition angles of the mirrors 6a and 6b and the distance from the polygon mirror 5 to the screen 9 are optimized, whereby three lines can be scanned on the screen 9 while the laser beam L4 is reflected at one reflection plane of the polygon mirror 5. Therefore, the rpm of the polygon mirror 5 is reduced, and noise and power consumption during rotation of the polygon mirror are reduced. Further, when the rpm of the polygon mirror 5 is fixed to a predetermined rpm, it is not necessary to increase the number of planes of the polygon mirror 5 for more scannings on the screen 9, thereby preventing the polygon mirror 5 from increasing in scale.

While in this first embodiment a pair of mirrors 6a and 6b are employed, only one mirror may be employed. In this case, the rpm of the polygon mirror 5 can be reduced to ½. Further, when the laser beam L4 is reflected by larger number of times than that in this first embodiment using a longer mirror or more mirrors, the rpm of the polygon mirror 5 can be further reduced.

Further, in the above description, the optical path length from the polygon mirror 5 to the screen 9 is adjusted to change the length of each of the scanning lines 11~13 to the original one line length on the screen. However, instead of adjusting the optical path length, the mirrors 6a and 6b may be rotatably disposed about an axis parallel to the vertical direction of the screen 9, and a mirror clinometer and a clinometer driver for driving the mirrors 6 and 6b may be provided, thereby to appropriately change the angles of inclination of the mirrors 6a and 6b under control of the controller 20.

Further, the density distribution of image, i.e., the interval of the scanning lines, at the upper and lower ends of the screen 9 is not equal to that in the center of the screen 9, and therefore, this nonuniformity must be corrected. This correction can be performed by using such as a fθ lens. Alternatively, an EO modulator may be driven by a correction circuit to adjust the line interval.

Furthermore, the laser display unit 30 according to the first embodiment may be applied to either of a front projection type display unit in which the laser beam L4 is applied to the screen 9 and the reflected light is monitored, and a rear projection type display unit in which the laser beam L4 passes through the screen, with the same effects as mentioned above. Further, while in this first embodiment the mirrors 6a and 6b are plane in shape, the shape of the mirrors 6a and 6b can be optimized depending on the type of the display unit, and it may have a shape other than plane.

Furthermore, while in this first embodiment the coherent light scanning system 30a is applied to the display unit, it may be applied to a laser beam printer to realize high-speed printing or high-definition printing. Alternatively, it may be applied to a copy machine or a facsimile machine that performs printing using a laser beam printer.

Moreover, while in this first embodiment an RGB signal is inputted to the display unit, the display unit may be adapted to a signal format other than an RGB signal by providing a D4 input terminal, a DVI-D input terminal, an IEEE1394 terminal, a component terminal, an S terminal, or a video terminal.

Embodiment 2

In a second embodiment, incident light onto a polygon mirror is deflected using a high-speed deflector so that plural coherent beams are incident on one plane of the polygon mirror, whereby plural lines can be simultaneously scanned on a screen.

Figure 4A:
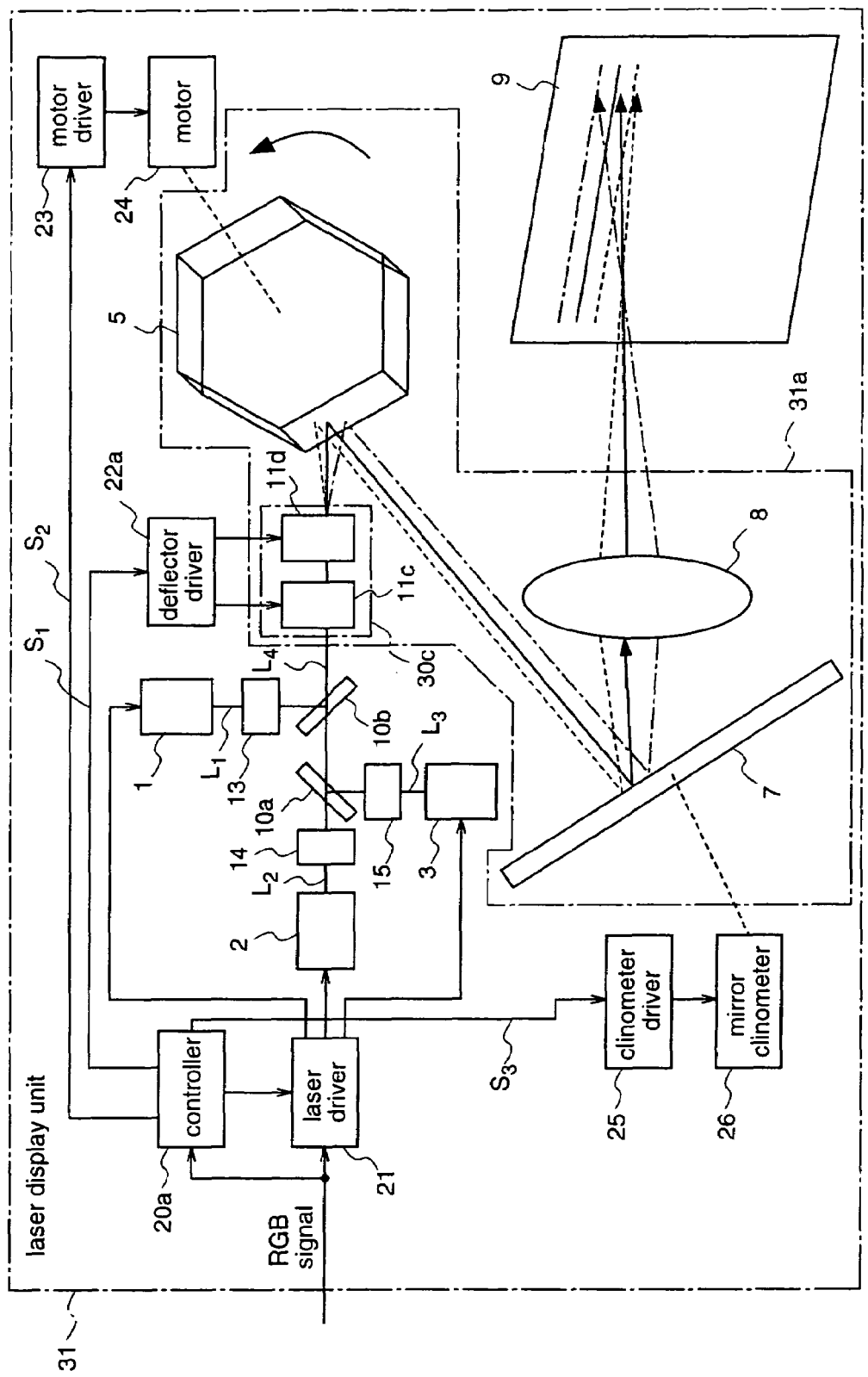
FIG. 4(a) is a diagram for explaining a display unit according to a second embodiment of the present invention.
Figure 4B:
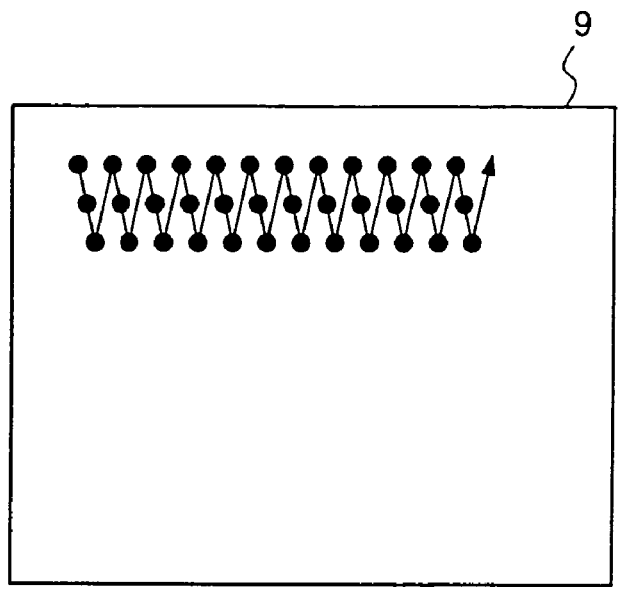
FIG. 4(b) is a diagram illustrating the operation for increasing the number of scanning lines by using a high-speed deflector according to the second embodiment.
Figure 4C:
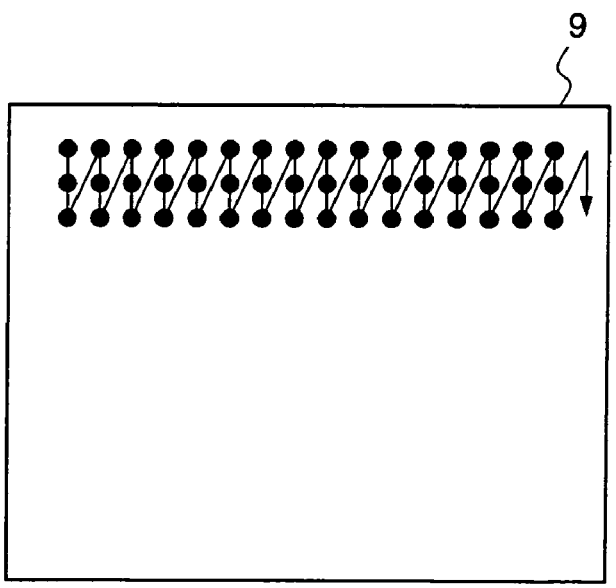
FIG. 4(c) is a diagram illustrating the operation for correcting increased lines by using a high-speed deflector according to the second embodiment.

FIG. 4(*a*) is a block diagram illustrating a schematic structure of a laser display unit 31 according to the second embodiment.

The laser display unit 31 according to the second embodiment is different from the laser display unit 30 in the construction of an optical path formation part 30c, and other constituents are identical to those of the first embodiment. Therefore, in FIG. 4(*a*), the same constituents as those of the laser display unit 30 of the first embodiment are given the same reference numerals, and specific description thereof will be omitted.

The optical path formation part 30c according to the second embodiment comprises a high-speed deflector 11c and a high-speed deflector 11d. The high-speed deflector 11c speedily deflects a laser beam L4 in the horizontal direction, that is, in the direction parallel to the scanning direction of the polygon mirror. The high-speed deflector 11d speedily deflects the laser beam L4 in the vertical direction, that is, in the direction perpendicular to the scanning direction of the polygon mirror. In this second embodiment, EO (Electro Optical) deflection devices are employed as the high-speed deflectors 11c and 11d. The EO deflection device gives an electric field to the laser beam L4 when a voltage is applied thereto, thereby deflecting the laser beam L4. Since the EO deflection device responds at very high speed, it is suitable for a device that requires ultra-high-speed scanning such as a display unit.

Next, the operation will be described.

In FIG. 4(*a*), the laser driver 21 applies a driving current to the laser sources 1, 2, and 3 on receipt of an externally inputted RGB signal, and the laser sources 1, 2, and 3 output laser beams L1, L2, and L3 corresponding to three colors of red, green, and blue, respectively. The laser beams L1, L2, and L3 are intensity-modulated by optical modulators 13, 14, and 15, and then wave coupled by using the dichroic mirrors 10a and 10b, resulting in a laser beam L4.

The laser beam L4 is deflected in the horizontal direction by the high-speed deflector 11c, and further, multiplied substantially to three laser beams by the high-speed deflector 11d to be applied to the polygon mirror 5. The three laser beams L4 reflected at the polygon mirror 5 are guided to the galvanometer mirror 7, and reflected at the galvanometer mirror 7 to be guided to the projection lens 8. The three laser beams L4 applied to the projection lens 8 are projected to the screen 9, whereby three scanning lines on the screen 9 are simultaneously scanned.

Next, the principle of scanning line multiplication by the optical path formation part 30c will be described.

FIG. 4(*b*) is a diagram illustrating scanning lines on the screen 9 in the case where deflection of the laser beam L4 by the high-speed deflector 11c is not carried out, and FIG. 4(*c*) is a diagram illustrating scanning lines on the screen 9 in the case where deflection of the laser beam L4 by the high-speed deflector 11c is carried out.

The laser beam L4 is speedily deflected along the vertical direction, i.e., the direction perpendicular to the scanning direction of the polygon mirror, by the high-speed deflector 11d. Therefore, substantially three laser beams are incident on one plane of the polygon mirror 5, and scanning is carried out such that the laser beam L4 jumps in three steps in the vertical direction on the screen as shown in FIG. 4(*b*).

When positional correction of the laser beam L4 in the horizontal direction is not carried out, pixels on the screen 9 are diagonally arranged as shown in FIG. 4(*c*) due to rotation of the polygon mirror 5. Therefore, positional correction in the horizontal direction is carried out using the high-speed deflector 11c so that the respective pixels are aligned in the vertical direction as shown in FIG. 4(*c*). Further, nonuniform distribution of density that occurs in the horizontal direction can be resolved using the high-speed deflector 11c.

The controller 20a controls the high-speed deflectors 11c and 11d through the deflector driver 22a to enable these deflections. As for the rpm of the motor and other targets of control, those are controlled in like manner as described for the controller 20 of the first embodiment. Further, as in the first embodiment, nonuniform intervals of scanning lines that occur between the upper (lower) end of the screen 9 and the center of the screen 9 can be adjusted by using a fθ lens or an EO modulator.

As described above, according to the second embodiment, since the laser beam L4 incident on the polygon mirror 5 is deflected in the direction corresponding to the vertical direction of the screen using the high-speed deflector 11d, substantially plural laser beams are incident on the polygon mirror 5, whereby plural scannings can be simultaneously carried out on the screen 9 while the laser beams are reflected at one plane of the polygon mirror 5. As a result, the rpm of the polygon mirror 5 is reduced, and noise and power consumption during the rotation of the polygon mirror can be reduced.

Further, according to the second embodiment, it is not necessary to use a scanning line multiplication mirror and a line memory in order to obtain plural scanning lines of the screen 9, whereby it is possible to reduce the rpm of the polygon mirror 5 with less number of components, while reducing mechanical adjustment points.

Further, when the rpm of the polygon mirror 5 is fixed to a predetermined rpm, it is not necessary to increase the number of planes of the polygon mirror 5 for more scanning lines on the screen 9, thereby preventing the polygon mirror 5 from increasing in scale.

While in this second embodiment the direction of the laser beam L4 incident on the polygon mirror 5 is deflected in three directions, if the laser beam L4 is deflected in more directions, the rpm of the polygon mirror can be further reduced.

The laser display unit 31 according to the second embodiment can be applied to a front projection type display unit or a rear projection type display unit, with the same effects of the second embodiment.

Further, the coherent light scanning system 31a of this second embodiment can be applied to a laser beam printer to realize high-speed printing or high-definition printing. Alternatively, it may be applied to a copy machine or a facsimile machine that performs printing using a laser beam printer.

Moreover, while in this second embodiment an RGB signal is inputted to the display unit, the display unit may be adapted to a signal format other than an RGB signal by providing a D4 input terminal, a DVI-D input terminal, an IEEE1394 terminal, a component terminal, an S terminal, or a video terminal.

Furthermore, the optical path formation part 30b of the first embodiment may be incorporated in the coherent light scanning system 31a of the second embodiment, whereby the number of scanning lines is further increased, and the rpm of the polygon mirror is further reduced.

Embodiment 3

In a third embodiment, laser light reflected by a polygon mirror is applied to a free-form surface mirror to enable scanning of plural lines on a screen.

Figure 5A:
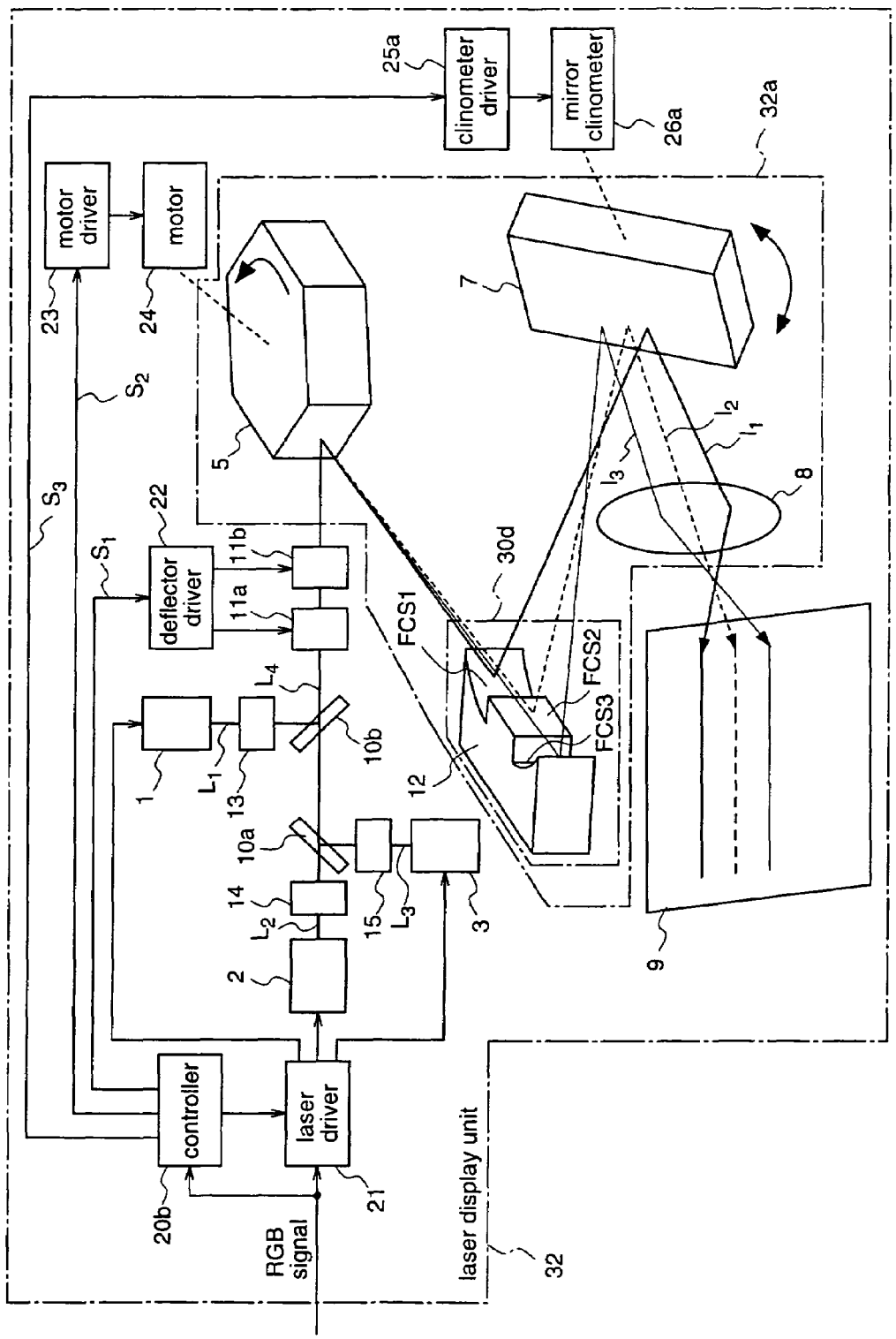
FIG. 5(a) is a diagram for explaining a display unit according to a third embodiment of the present invention.

FIG. 5(a) is a block diagram illustrating a schematic structure of a laser display unit 32 according to the third embodiment.

The laser display 32 of this third embodiment is different from the laser display 30 of the first embodiment in the construction of an optical path formation part 30d, and other components of the laser display 32 are identical to those of the laser display 30. Therefore, in FIG. 5(a), the same components as those of the laser display 30 of the first embodiment are given the same reference numerals, and specific descriptions there will be omitted.

The optical path formation part 30d of the third embodiment comprises a free-form surface mirror 12. The free-form surface mirror 12 can enable laser light to scan in an arbitrary direction without occurring aberration.

The free-form surface mirror 12 has first, second, and third reflection planes FCS1, FCS2, and FCS3 as shown in FIG. 5(a). The reflection planes FCS1 and FCS3 have free-form surfaces, and the reflection plane FCS2 sandwiched between the reflection planes FCS1 and FCS3 has a flat surface. Further, the shapes of the reflection planes FCS1, FCS2, and FCS3 are designed such that the laser beams L4 reflected at the respective reflection planes scan equal ranges on the screen 9. A coherent light scanning system 32a is disposed such that a scanning line obtained by reflecting the laser beam L4 at each of the reflection planes FCS1, FCS2, and FCS3 has a length of one scanning line on the screen 9, like in the first embodiment.

Figure 5B:
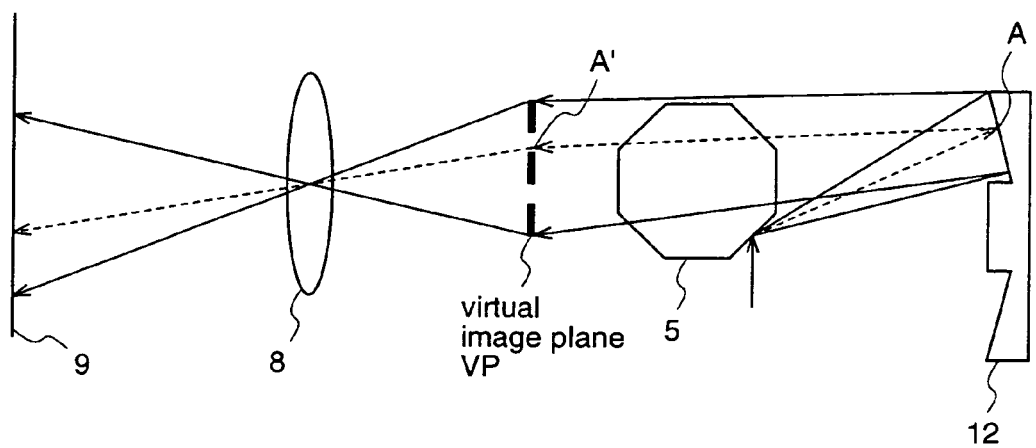
FIG. 5(b) is a diagram for explaining the principle of determining the shape of a free-form surface mirror according to the third embodiment.

The free-form surface shape of the free-form surface mirror 12 is determined as follows. FIG. 5(b) is a schematic view of a scanning optical system. In FIG. 5(b), reference numeral 5 denotes a polygon mirror, numeral 8 denotes a projection lens, numeral 9 denotes a screen, and numeral 12 denotes a free-form surface mirror. The projection lens 8 projects an image on a virtual image plane VP on the screen 9 by one-to-one correspondence.

The shape of the free-form mirror 12 can be obtained by successively calculating the gradients of the mirror surface at plural points on the mirror surface. For example, the gradient in the horizontal direction at a point A on the mirror 12 shown in FIG. 5(b) can be obtained from an angle formed by a beam from the polygon mirror 5 to the point A on the free-form surface and a beam to a target point A' on the virtual image plane VP.

The optical system using the free-form mirror 12 is characterized by that fluctuations in the scanning speed when scanning is performed by the polygon mirror can easily be eliminated. That is, when a light spot scanned by the polygon mirror 5 is projected directly onto the screen, a scanning position x on the screen is expressed by $x=L \times \tan \theta$ using a scanning angle $\theta$ of the polygon mirror 5 and a distance L between the polygon mirror 5 and the screen 9, and the scanning speed varies according to the scanning angle $\theta$. As a method for correcting this variation, for example, the light beam from the polygon mirror may be projected on the screen through a so-called f$\theta$ lens. However, the f$\theta$ lens needs a specific design such as using an aspheric lens. On the other hand, in the optical system using the free-form surface mirror 12, when determining the shape of the free-form surface mirror 12, since the position of the target point on the virtual image plane VP is set linearly with respect to the scanning angle $\theta$, linear spot position scanning can be carried out with respect to the scanning angle $\theta$ by the polygon mirror 5, whereby nonuniform distribution of density in the horizontal direction as shown in FIG. 3(b) can be resolved.

Next, the operation will be described. In the following description, the controller 20b controls the mirror clinometer 26a for the galvanometer mirror 7 through the clinometer driver 25a like in the first embodiment, and the galvanometer mirror 7 guides the laser beam L4 to the projection lens 8 with the angle of gradient thereof being varied while the light beams reflected at the respective reflection planes of the free-form surface mirror 12 are incident thereto.

In FIG. 5(a), the laser driver 21 applies a driving current to the laser sources 1, 2, and 3 on receipt of an externally inputted RGB signal, and the laser sources 1, 2, and 3 outputs laser beams L1, L2, and L3 of red, green, and blue, respectively. The laser beams L1, L2, and L3 are intensity-modulated by the optical modulators 13, 14, and 15, and then wave coupled by the dichroic mirrors 10a and 10b, resulting in a laser beam L4. The laser beam L4 is subjected to positional correction in the horizontal direction and the vertical direction by the high-speed deflector 16 and, thereafter, applied to the polygon mirror 5.

The laser beam L4 reflected at the polygon mirror 5 is initially applied to the first reflection plane FCS1 of the free-form surface mirror 12, and sequentially scans the reflection plane FCS1 from an end on the polygon mirror 5 side, according to rotation of the polygon mirror 5. The laser beam L4 reflected at the reflection plane FCS1 is applied to the galvanometer mirror 7 and the projection lens 8 through the optical path shown by a thick line 11 in FIG. 5(a), and then projected onto the screen 9 from the left toward the right.

When the polygon mirror 5 is further rotated, the laser beam L4 is applied to the second reflection plane FCS2, and sequentially scans the reflection plane FCS2 from an end on the polygon mirror 5 side. The laser beam L4 reflected at the reflection plane FCS2 is applied to the galvanometer mirror 7 and the projection lens 8 through the optical path indicated by a dotted line 12 in FIG. 5(a), and then projected onto the screen 9 from the right toward the left.

When the polygon mirror 5 is further rotated, the laser beam L4 is applied to the third reflection plane FCS3, and sequentially scans the reflection plane FCS3 from an end on the polygon mirror 5 side. The laser beam L4 reflected at the reflection plane FCS3 is applied to the galvanometer mirror 7 and the projection lens 8 through the optical path indicated by a thin line 13 in FIG. 5(a), and then projected onto the screen 9 from the left toward the right. Other controls to be performed by the controller 20, such as rpm control for the motor and output control for the RGB signal using the line memory (not shown), are carried out in like manner as mentioned for the first embodiment.

As described above, according to the third embodiment, the free-form surface mirror 12 having plural reflection planes is disposed on the path of the reflected light from the polygon mirror 5, and the shape of the free-form surface mirror 12 is designed such that the laser beams L4 reflected at the respective reflection planes have equal scanning ranges on the screen 9, and the respective laser beams L4 reflected at the reflection planes of the free-form surface mirror 12 are projected onto the screen 9. Therefore, scanning of plural lines can be carried out on the screen 9 while the laser beam L4 is reflected at one reflection plane of the polygon mirror 5, whereby the rpm of the polygon mirror 5 is reduced, and noise and power consumption during rotation of the polygon mirror 5 can be reduced. Further, even when the rpm of the polygon mirror 5 is fixed to a predetermined rpm, it is not necessary to increase the number of planes of the polygon mirror 5 for more scanning lines on the screen 9, and therefore, reduction in scale of the polygon mirror 5 can be achieved.

The laser display unit 32 according to the third embodiment can be applied to a front projection type display unit or a rear projection type display unit, with the same effects of the third embodiment.

Further, the coherent light scanning system 32a of this third embodiment can be applied to a laser beam printer to realize high-speed printing or high-definition printing. Alternatively, it may be applied to a copy machine or a facsimile machine that performs printing using a laser beam printer.

Moreover, while in this third embodiment an RGB signal is inputted to the display unit, the display unit may be adapted to a signal format other than an RGB signal by providing a D4 input terminal, a DVI-D input terminal, an IEEE1394 terminal, a component terminal, an S terminal, or a video terminal.

Furthermore, the optical path formation part 30b or 30c according to the first or second embodiment may be incorporated in the coherent light scanning system 31a of the third embodiment, whereby the number of scanning lines is further increased, and the rpm of the polygon mirror is further reduced.

Embodiment 4

In a fourth embodiment, laser light reflected at a polygon mirror is applied to a free-form surface mirror to enable scanning of plural lines on a screen, and further, the free-form surface mirror is provided with a vertical rotation mechanism, whereby two-dimensional scanning on the screen is realized without providing a galvanometer mirror.

Figure 6:
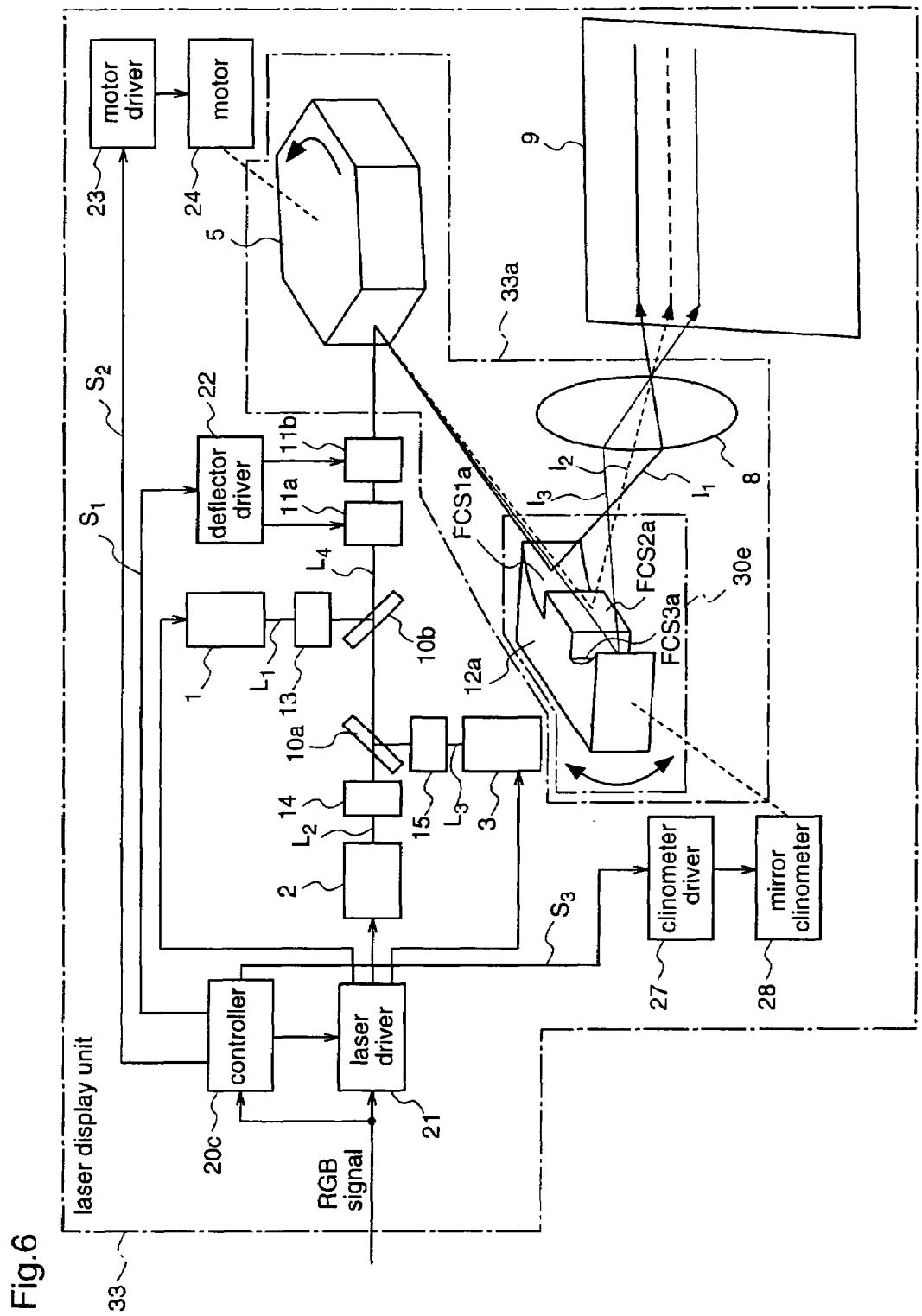
FIG. 6 is a diagram for explaining a display unit according to a fourth embodiment of the present invention.
Figure 7A:
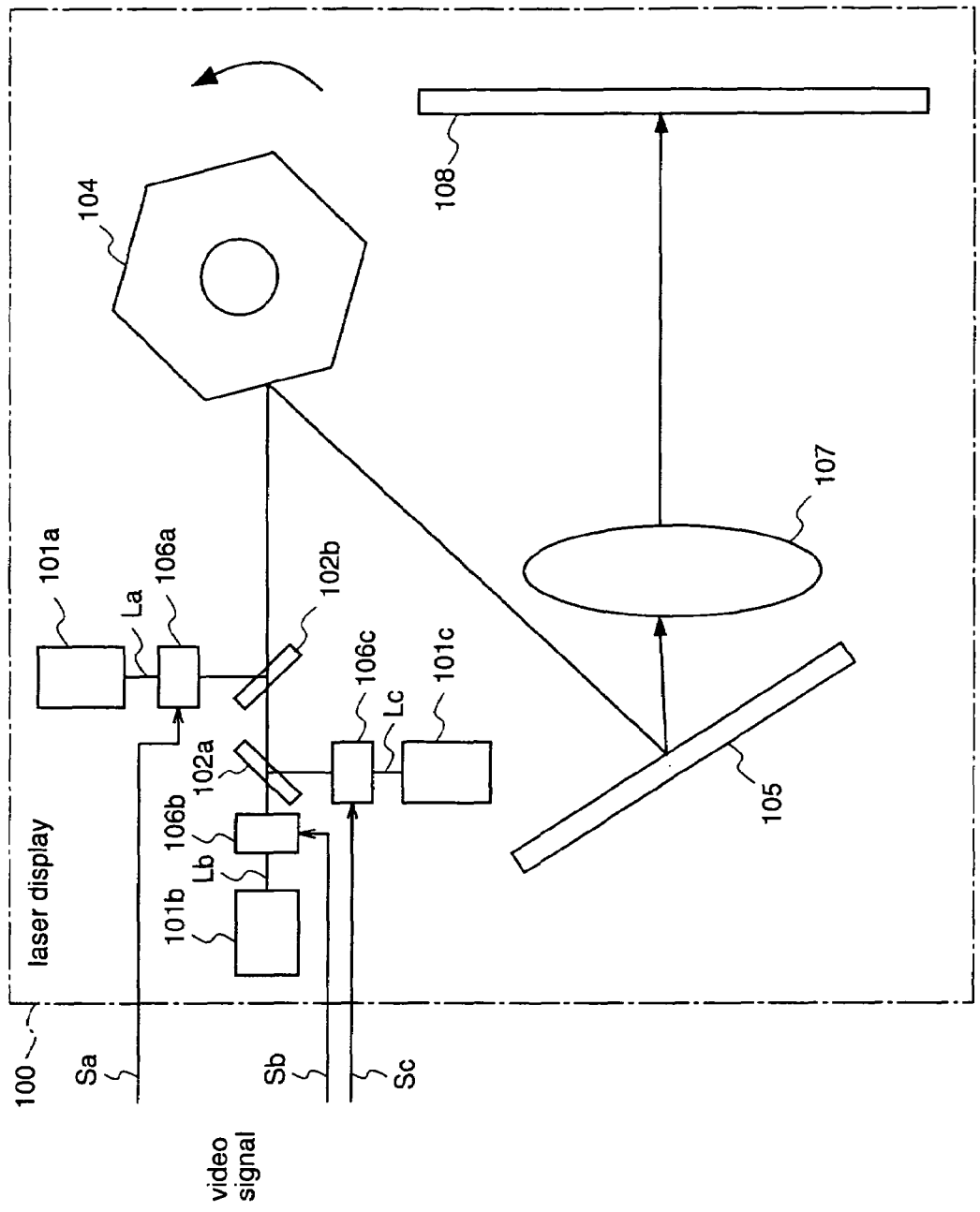
FIG. 7(a) is a schematic block diagram of a conventional display unit.

FIG. 6 is a block diagram illustrating a schematic structure of a laser display unit 33 according to the fourth embodiment of the present invention.

In the laser display unit 33 according to the fourth embodiment, vertical scanning by rotation of the galvanometer mirror 7 in the laser display unit 32 according to the third embodiment is carried out by rotation of the free-form surface mirror 12.

That is, the laser display unit 33 of this fourth embodiment includes a coherent light scanning system 33a comprising a polygon mirror 5, a rotatable free-form surface mirror 12a, a rotation mechanism (not shown) for rotating the free-form surface mirror 12a, and a projection lens 8, instead of the coherent light scanning system 32a of the laser display unit 32, and further, the laser display unit 33 includes a mirror clinometer 28 and a clinometer driver 27 for driving the rotation mechanism.

Accordingly, the laser display unit 33 does not include a galvanometer mirror 7, a mirror clinometer 26a, and a clinometer driver 25a according to the third embodiment.

Further, the shapes of reflection planes FCS1a, FCS2a, and FCS3a of the free-form surface mirror 12a are optimized so that deformation of the laser beam L4 is prevented when the free-form surface mirror 12a is rotated in the vertical direction, and scanning in the vertical direction is not affected. The shapes of the reflection planes of the free-form surface mirror 12a can be determined in the same process as described for the third embodiment.

Next, the operation will be described.

In FIG. 6, the laser beams L1, L2, and L3 outputted from the laser sources 1, 2, and 3 are wave coupled by the dichroic mirrors 10a and 10b, resulting in a laser beam L4. The laser beam L4 is reflected at the polygon mirror 5, and sequentially applied to the first, second, and third reflection planes FCS1, FCS2, and FCS3, like in the third embodiment.

The controller 20b controls the mirror clinometer 28 through the clinometer driver 27, and the free-form surface mirror 12a guides the laser beam L4 to the projection lens 8 with the angle of gradient thereof being varied while the respective reflection planes reflect the laser beam L4. The laser beam L4 incident on the projection lens 8 is projected onto the screen 9, whereby the laser beam L4 is projected onto the screen 9 through the optical paths indicated by 11~13 while the laser beam L4 is reflected at one plane of the polygon mirror 5, and three lines of scannings are carried out in the horizontal direction on the screen 9. Other controls such as rpm control for the motor 24 are carried out in like manner as performed by the controller 20 of the third embodiment.

As described above, according to the fourth embodiment, the free-form surface mirror 12a having plural reflection planes is disposed on the path of the reflected light from the polygon mirror 5, and the shape of the free-form surface mirror 12 is designed such that the laser beams L4 reflected at the respective reflection planes have equal scanning ranges on the screen 9, and further, the free-form surface mirror 12a is rotated in the vertical direction with respect to the screen 9 while the polygon mirror 5 scans the laser beam L4. Therefore, it is possible to realize, with less number of components, a laser display unit that reduces the rpm of the polygon mirror 5 and reduces noise and power consumption during rotation of the polygon mirror.

The laser display unit 33 according to the fourth embodiment can be applied to a front projection type display unit or a rear projection type display unit, with the same effects of the fourth embodiment. Further, while in this fourth embodiment the mirrors 6a and 6b are plane in shape, the shapes of the mirrors 6a and 6b can be optimized according to the type of the display unit, and are not restricted to plane.

Further, the coherent light scanning system 33a of this fourth embodiment can be applied to a laser beam printer to realize high-speed printing or high-definition printing. Alternatively, it may be applied to a copy machine or a facsimile machine that performs printing using a laser beam printer.

Moreover, while in this fourth embodiment an RGB signal is inputted to the display unit, the display unit may be adapted to a signal format other than an RGB signal by providing a D4 input terminal, a DVI-D input terminal, an IEEE1394 terminal, a component terminal, an S terminal, or a video terminal.

Furthermore, the optical path formation part 30b or 30c according to the first or second embodiment may be incorporated in the coherent light scanning system 30e of the fourth embodiment, whereby the number of scanning lines is further increased, and the rpm of the polygon mirror is further reduced.

APPLICABILITY IN INDUSTRY

A display unit and a scanning method therefor according to the present invention are useful in that reduced power consumption and reduced noise in a display device that displays an image by scanning coherent light can be achieved.

The invention claimed is:

1. A display unit having a coherent light scanning system for scanning coherent light, and projecting the coherent light onto a screen, said coherent light scanning system comprising:
a coherent light generator for receiving a coherent light generation signal and for outputting coherent light;
a polygon mirror for receiving the coherent light from the coherent light generator and for reflecting the coherent light to be projected on the screen; and
an optical path formation part for receiving the coherent light from the polygon mirror and transmitting the coherent light onto the screen, such that each reflection plane of the polygon mirror corresponds to multiple scans of coherent light on the screen and at least one change in a scanning direction of the coherent light on the screen during each rotation of the polygon mirror,
wherein the scanning direction of coherent light on the screen changes corresponding to an angle of the polygon mirror relative to the coherent light received at the polygon mirror, and
the coherent light generator signal corresponds to a string of data, the string of data being read in a first direction corresponding to a first scan direction of coherent light on the screen, and being read in a reverse direction corresponding to a second scan direction of coherent light on the screen.

2. A display unit as defined in claim 1 wherein said optical path formation part comprises at least one reflection mirror for reflecting the coherent light from the polygon mirror.

3. A display unit as defined in claim 2 wherein said reflection mirror is for reflecting the coherent light from the polygon mirror while the rotation angle of the polygon mirror is within a predetermined range.

4. A display unit as defined in claim 3 wherein the optical path formation part comprises a plurality of said reflection mirrors.

5. A display unit as defined in claim 4 wherein said plural reflection mirrors are two mirrors, each having a reflection surface opposite the other; and
said two reflection mirrors are located so that the coherent light from a single reflection surface of the polygon mirror is reflected off of each of the reflection surfaces of the two reflection mirrors and passes through a space between the two reflection mirrors, respectively, and
each of (1) the coherent light reflected from each of the reflection surfaces of the two reflection mirrors, and (2) the coherent light that passes between the two reflection mirrors, generates a scan on the screen, and each of the scans has substantially the same width on the screen.

6. A display unit as defined in claim 5 wherein said reflection mirrors multiple-reflect the coherent light.

7. A display unit as defined in claim 5 wherein said two reflection mirrors are rotatable about an axis that is perpendicular to the scanning direction of the coherent light.

8. A display unit as defined in claim 1, further comprising a high-speed deflector for deflecting a single beam of coherent light from the coherent light generator to generate plural beams, and for outputting the plural beams to the polygon mirror.

9. A display unit as defined in claim 8 wherein said high-speed deflector comprises an EO (Electro Optical) deflection device.

10. A display unit as defined in claim 8 wherein said high-speed deflector deflects the coherent light along a direction that is approximately perpendicular to the scanning direction of the polygon mirror.

11. A display unit as defined in claim 1 wherein said optical path formation part includes a free-form surface mirror located on a path of reflected light from the polygon mirror, and has at least one reflection plane of free-form surface shape.

12. A display unit as defined in claim 11 wherein said free-form surface mirror has two or more reflection planes.

13. A display unit as defined in claim 12 wherein said reflection planes include first and third reflection planes of free-form surface shapes, and a second reflection plane of planar shape, which is sandwiched between the first and third reflection planes.

14. A display unit as defined in claim 13 wherein said first to third reflection planes are shaped such that the respective coherent light beams applied to the first to third reflection planes scan the same range on the screen.

15. A coherent light scanning method for performing scanning with coherent light on a screen, comprising:
generating coherent light;
reflecting the coherent light from a polygon mirror;
rotating the polygon mirror to generate a scan on the screen by the coherent light reflected from the polygon mirror; and
manipulating an optical path of the coherent light from the polygon mirror so that each reflection plane of the polygon mirror corresponds to a plurality of scans on the screen, the scans moving in a plurality of directions across the screen during each rotation of the polygon mirror.

16. A coherent light scanning method according to claim 15, wherein
at least one mirror which is located on the optical path of reflected light from the polygon mirror to the screen, for manipulating the optical path of the coherent light from the polygon mirror.

* * * * *